US010065562B2

(12) United States Patent
Bernstein et al.

(10) Patent No.: US 10,065,562 B2
(45) Date of Patent: Sep. 4, 2018

(54) VEHICLE COLLISION AVOIDANCE

(71) Applicant: International Business Machines Corporation, Armonk, NY (US)

(72) Inventors: Yaniv Bernstein, Melbourne (AU); Timothy M. Lynar, Melbourne (AU)

(73) Assignee: International Business Mahcines Corporation, Armonk, NY (US)

(*) Notice: Subject to any disclaimer, the term of this patent is extended or adjusted under 35 U.S.C. 154(b) by 292 days.

(21) Appl. No.: 14/144,890

(22) Filed: Dec. 31, 2013

(65) Prior Publication Data
US 2015/0329044 A1    Nov. 19, 2015

(51) Int. Cl.
*B60Q 1/00* (2006.01)
*B60Q 9/00* (2006.01)
(Continued)

(52) U.S. Cl.
CPC ............ *B60Q 9/008* (2013.01); *G08G 1/165* (2013.01); *G08G 1/166* (2013.01); *G08G 1/205* (2013.01)

(58) Field of Classification Search
CPC ........ B60Q 9/008; B60Q 9/006; B60Q 9/007; B60Q 5/006; B60Q 1/525; B60Q 1/00; G08G 1/166; G08G 1/16; G08G 1/163; G08G 5/045; G06K 9/00805; G06K 9/00369; G06K 9/00825; G06K 9/2018; B60R 2300/8093; B60R 21/0134; B60R 21/013; G06T 2207/10048; G06T 2207/30261; G06T 7/2033; G06T 7/004; B60T 2201/081; B60T 2201/022; B60W 30/09; B60W 30/08; B60W 30/095; B60K 31/0008; G05D 1/0289
(Continued)

(56) References Cited

U.S. PATENT DOCUMENTS 5,465,079 A * 11/1995 Bouchard ............. G01S 13/325
                                                        180/272
6,470,731 B1 * 10/2002 Rieth ................. B60K 31/0008
                                                          73/9
(Continued)

FOREIGN PATENT DOCUMENTS

CN    101031818 A    9/2007
CN    103164987 A    6/2013
(Continued)

OTHER PUBLICATIONS

Disclosed Anonymously, "System and Method for Automobile and Bicycle Safety"; IP.com Electronic Publication: Sep. 16, 2011, IP.com No. IPCOM000210925D.
(Continued)

*Primary Examiner* — Emily C Terrell
(74) *Attorney, Agent, or Firm* — Michael O'Keefe

(57) ABSTRACT

A monitoring area may be defined for a monitoring device attached to a first object, wherein the monitoring area moves with the monitoring device. The monitoring device may detect a second object in the monitoring area. A collision awareness factor may be determined in relation to the monitoring area, and a warning zone may be defined in relation to the monitoring area based on the collision awareness factor. A warning may be generated based on detecting the second object within the warning zone and based on the collision awareness factor.

17 Claims, 7 Drawing Sheets

(51) Int. Cl.
*G08G 1/16* (2006.01)
*G08G 1/00* (2006.01)

(58) Field of Classification Search
USPC .................................................. 340/435, 436
See application file for complete search history.

(56) References Cited

U.S. PATENT DOCUMENTS

| | | | |
|---|---|---|---|
| 6,707,391 | B1 | 3/2004 | Monroe |
| 6,714,139 | B2 | 3/2004 | Saito et al. |
| 7,586,402 | B2 | 9/2009 | Bihler et al. |
| 9,718,468 | B2* | 8/2017 | Barfield, Jr. ........ B60W 30/095 |
| 2003/0007074 | A1* | 1/2003 | Nagaoka et al. ............. 348/148 |
| 2005/0073433 | A1* | 4/2005 | Gunderson et al. .......... 340/903 |
| 2005/0073438 | A1* | 4/2005 | Rodgers ................. G08G 1/166 |
| | | | 340/944 |
| 2006/0031015 | A1* | 2/2006 | Paradie .......................... 701/301 |
| 2007/0146146 | A1* | 6/2007 | Kopf ..................... B60Q 9/008 |
| | | | 340/575 |
| 2008/0036576 | A1* | 2/2008 | Stein ........................ B60R 1/00 |
| | | | 340/425.5 |
| 2008/0042812 | A1* | 2/2008 | Dunsmoir .......... G06K 9/00805 |
| | | | 340/435 |
| 2009/0033477 | A1 | 2/2009 | Illium et al. |
| 2009/0174573 | A1* | 7/2009 | Smith .................. G08G 1/0962 |
| | | | 340/905 |
| 2010/0030474 | A1* | 2/2010 | Sawada ......................... 701/301 |
| 2010/0289632 | A1* | 11/2010 | Seder .................... G01S 13/723 |
| | | | 340/436 |
| 2011/0141593 | A1 | 6/2011 | Kanning et al. |
| 2012/0041632 | A1* | 2/2012 | Garcia Bordes .. B60W 30/0953 |
| | | | 701/29.1 |
| 2012/0147188 | A1 | 6/2012 | Yokochi et al. |
| 2013/0124052 | A1* | 5/2013 | Hahne .................. B60R 21/013 |
| | | | 701/46 |
| 2013/0144520 | A1 | 6/2013 | Ricci |
| 2015/0091716 | A1* | 4/2015 | Hathaway .............. B60Q 1/525 |
| | | | 340/435 |

FOREIGN PATENT DOCUMENTS

| | | |
|---|---|---|
| CN | 203666504 U | 6/2014 |
| CN | 104794936 A | 7/2015 |
| CN | 105473402 A | 4/2016 |
| EP | 1433657 | 10/2007 |
| JP | 04201641 A | 7/1992 |
| JP | 2003016429 A | 1/2003 |
| JP | 2003300492 A | 10/2003 |
| JP | 2008302850 A | 12/2008 |
| JP | 2012048460 A | 3/2012 |
| JP | 2012164158 A | 8/2012 |
| JP | 2014016888 A | 1/2014 |
| WO | 9831572 | 7/1998 |
| WO | 2005047035 | 5/2005 |
| WO | 2014095104 A1 | 6/2014 |

OTHER PUBLICATIONS

Carey, "No loss of points for bike 'dooring'", Aug. 29, 2012, http://www.theage.com.au/victoria/no-loss-of-points-for-bike-dooring-20120828-24ypg.html#ixzz2K3yb7C5b, Accessed on Oct. 15, 2013, pp. 1-3.

Mell et al., "The NIST Definition of Cloud Computing", Version 15, Oct. 7, 2009, National Institute of Standards and Technology, Information Technology Laboratory.

Pening Application No. 102014117574.3 (DE), filed on Dec. 1, 2014, titled "Vehicle Collision Avoidance," pp. 1-44.

* cited by examiner

US 10,065,562 B2

VEHICLE COLLISION AVOIDANCE

FIELD OF THE INVENTION

The present disclosure generally relates to object detection, and more particularly to automated collision avoidance systems for vehicles.

BACKGROUND

Moving vehicles such as bicycles are in danger of collision with various obstacles along their direction of movement. Some existing collision avoidance solutions monitor an area around a vehicle and generate a warning based on detecting an object that poses a risk of collision with the vehicle. These solutions are limited because they do not provide dynamic adjustment of the area they monitor and do not account for dynamically changing factors that affect the risk of collision.

BRIEF SUMMARY

Embodiments of the present disclosure provide a method, system, and computer program product for generating a collision warning. A monitoring area may be defined for a monitoring device attached to a first object, wherein the monitoring area moves with the monitoring device. The monitoring device may detect a second object in the monitoring area. A collision awareness factor may be determined in relation to the monitoring area. A warning zone may be defined in relation to the monitoring area, based on the collision awareness factor. A determination is made as to whether the second object is within the warning zone. A warning is generated upon detecting that the second object is within the warning zone and based on the collision awareness factor.

DETAILED DESCRIPTION

Figure 1A:
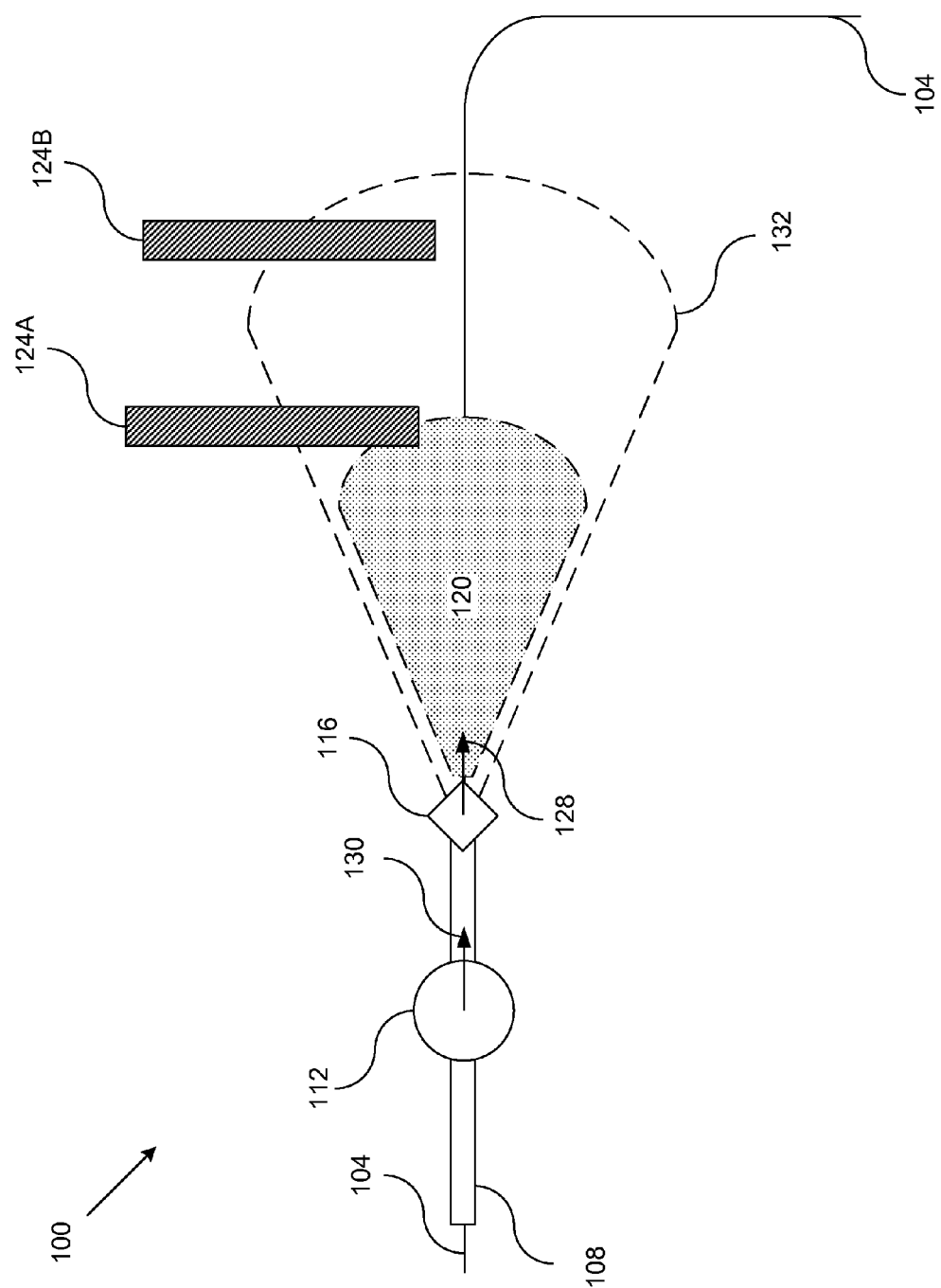
FIG. 1A is a schematic diagram of a collision detection environment including a vehicle travelling along a path where an operator is looking in a direction of movement of the vehicle, according to an aspect of the present disclosure.

FIG. 1A is a schematic diagram of a collision detection environment 100 including a vehicle 108 travelling along a path 104 along a direction of movement 128, towards objects 124. The vehicle 108 may be, for example a bicycle, operated by a bicyclist. The path 104 may be, for example, a road. The vehicle 108 may include a warning system 116 that monitors a monitoring area 132 in the direction of movement 128 of the vehicle 108. The monitoring area 132 may include a warning zone 120, whereby detection of the objects 124 in the warning zone 120 may trigger generation of a warning signal. The vehicle 108 may also include an orientation device 112 that detects a focus direction 130. The focus direction 130 may correspond to the orientation of an object, and may be used to determine a collision awareness factor, according to embodiments of the present disclosure.

The warning system 116 may generate a warning signal in response to detecting an object 124 in the warning zone 120 of the monitoring area 132. The signal may include, for example, an electrical signal, an audible tone or message, and/or a visual signal. The warning system 116 may transmit the electrical warning signal to other components of the vehicle 108 or to a receiving device that is in communication with warning system 116, such as a digital display or an audio component. The transmitted warning signal may serve to initiate an automated response by a receiving device and/or to alert an operator (not shown) of the vehicle 108 of a need for taking a responsive action. The receiving device may be, for example, an automatic braking device. The responsive action may be, for example, maneuvering around the object 124.

The collision detection environment 100 may include an orientation device 112 coupled to the warning system 116. The orientation device 112 may be oriented in a focus direction 130 that is independent of the direction of movement 128 of the vehicle 108, and indicates that another component of the vehicle 108 to which the orientation device 112 is operatively connected is focused/oriented in the focus direction 130. The orientation device 112 may be, for example, a gyroscope, which may be coupled with an accelerometer. In one embodiment, the orientation device 112 may be attached to a helmet wearable by a bicyclist, such that when worn, the focus direction 130 of the orientation device 112 detects the orientation of the helmet, and may indicate the bicyclist's likely line of sight.

The collision detection environment 100 may further include one or more objects 124, for example, object 124A and object 124B. An object 124 may be any physical object that can be detected by the warning system 116 within the monitoring area 132. An object 124 may be, for example, a wall, a bump or a pothole in a road, debris, a vehicle, a pedestrian, an animal, or any other object that warning system 116 is capable of detecting within its monitoring area 132.

The warning system 116 may detect an object 124 within the monitoring area 132 based on a monitoring configuration that may depend, in part, on factors such as the type of vehicle 108 on which the warning system 116 is used, and the type of objects 124 it is likely to encounter and which may present a risk of collision with the vehicle 108. For example, an object 124 with the dimensions 2×2 feet may be considered large and necessary to detect with respect to a bicycle, but not with respect to a larger vehicle, because the object 124 may not pose a damage risk to the larger vehicle. In this example, settings of the warning system 116 may be adjusted so as to detect objects 124 having a size or other properties within a desired range.

The warning zone 120 may be defined such that it is within the monitoring area 132, and encompasses at least a portion of the monitoring area 132. An object, for example, the object 124A, may present a relatively high risk of collision with the vehicle 108 if some or all of the object is within warning zone 120. The shape and size of the warning zone 120 may be determined based on many factors, including static and dynamic factors. Static factors upon which the shape and size of the warning zone 120 may be based include, without limitation:

- The type of the vehicle 108. For example, the warning zone 120 may be defined more narrowly for a train than for a car because the path 104 for the train may be a set of train tracks, whereas a path 104 for the car may be a four-lane highway. In this example, it may be the case that objects 124 that present a relatively high risk of collision with the vehicle 108 are likely to appear in a wider area for a car compared to a train. This may be because a car may travel on a multi-lane road and regularly be surrounded by other cars in neighboring lanes, whereas this may not be the case for a train.
- Maneuverability of the vehicle 108. For example, the warning zone 120 of a train may be defined to span a greater distance ahead of the train compared to the warning zone 120 ahead of a car, because it may be the case that the train cannot maneuver as well as a car, and may require longer distances to come to a stop if faced with an object 124 having a relatively high risk of collision, whereas a car may simply swerve or change lanes to avoid an object in its path 104.
- The type of objects 124 expected to be encountered by the vehicle 108. This may require, in one example, that the warning zone 120 be defined more widely for certain vehicles 108 and/or collision detection environments 100. In the case of a bicycle travelling on a paved road, for example, the objects 124 may include cars, pedestrians, or debris, whereas the objects 124 for a bicycle travelling on an unpaved bicycle trail may include animals, rocks, and vegetation (it is not necessary that the warning system 116 be capable of identifying these objects as such). It may be the case that the objects 124 that a bicycle is likely to encounter may appear from the sides of the path 104. Therefore, it may be desirable to define the warning zone 120 more widely for a bicycle than for a car.

Dynamic factors upon which the shape and size of the warning zone 120 may be defined are listed below. These dynamic factors may be measured or determined by components of the warning system 116, which are described in greater detail below, in relation to FIG. 2. The dynamic factors, individually or collectively, may be used by the warning system 116 to determine a collision awareness factor. The collision awareness factor is a measure that may be used by the warning system 116 as an indication of the awareness of an operator of the vehicle 108 in the collision detection environment 100, and may be used to adjust the shape, size, and other properties of the warning zone 120, in accordance with embodiments of the present disclosure. The dynamic factors may include, without limitation:

- The direction of movement 128 of the vehicle 108 along the path 104. The collision awareness factor may be lowered by the warning system 116 based on a change in the direction of movement 128, where the change is higher than a threshold value. The direction of movement 128 may be determined by a direction sensor component of the warning system 116. A change in direction higher than a threshold value may indicate that the operator of the vehicle 108 is less aware of the objects 124 in the changed direction.
- The velocity of the vehicle 108. For example, if the vehicle's 108 velocity is higher than a threshold value, the collision awareness factor may be decreased. Similarly, the collision awareness factor may be decreased upon the warning system 108 detecting an acceleration higher than a threshold value. In each instance, this may be desired where increased speed and/or increased acceleration above corresponding threshold values may be indicative of a lowering of the operator's awareness of objects 124 in the collision detection environment 100.
- An angular divergence of the focus direction 130 relative to the direction of movement 128 of the vehicle 108. The higher the divergence, the lower the collision awareness factor may be.
- The number and distribution of the objects 124 in the monitoring area 132. The more objects 124 there are in the monitoring area, and the more densely distributed they are, the lower the collision awareness factor may be.
- The velocity of the objects 124 in the monitoring area 132. For each object 124 detected in the monitoring area 132, its velocity may influence the collision awareness factor: the higher the velocity, the lower the collision awareness factor. The collision awareness factor may also be based on an average velocity of all the objects 124 detected in the monitoring area 132.
- The size and shape of the objects 124 in the monitoring area 132. The smaller the objects 124, the lower the collision awareness factor may be.
- The position and proximity of the objects 124 in the monitoring area 132 to the vehicle 108. Objects in the peripheral areas of the monitoring area 132 may lower the collision awareness factor. Where an average distance of the objects 124 detected within the monitoring area, relative to the vehicle 108, is less than a threshold value, the collision awareness factor may be decreased.
- Weather conditions in the collision detection environment 100. For example, the warning system may detect humidity levels in the collision detection environment 100 using a humidity sensor, or receive humidity information from an external device in communication with the warning system 116. The warning system 116 may decrease the collision awareness factor as humidity increases.
- Light conditions in the collision detection environment 100. The less light available, the lower the collision awareness factor may be. For example, the collision awareness factor may be adjusted, based on the time, or based on a measurement of light by an optical sensor, in the collision detection environment 100.

In a related embodiment, the same dynamic factors that dynamically define the warning zone 120, based on a collision awareness factor, may also dynamically define the monitoring area 132. This may be desirable where, for example, an increased collision awareness factor reduces a need for scanning a relatively large monitoring area 132. This may conserve computing resources of the warning system 116, such that, for example, it generates more detailed information about objects 124 in a relatively narrow monitoring area 132, compared to information it can generate for objects 124 in a relatively wide monitoring area 132.

Figure 1B:
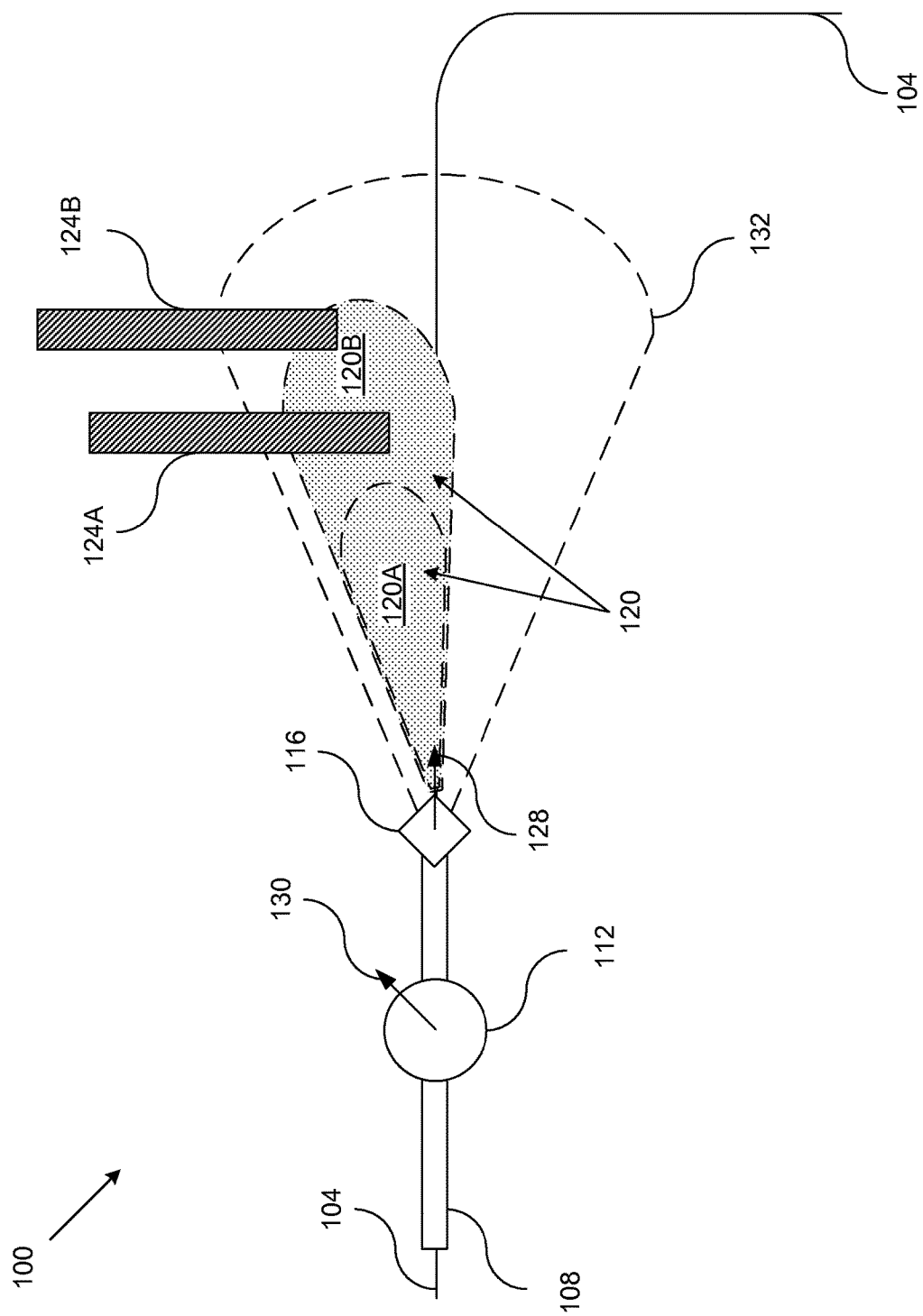
FIG. 1B is a schematic block diagram of the collision detection environment depicted in FIG. 1A wherein the operator of the vehicle is looking in a direction different from the direction of movement of the vehicle, according to an aspect of the present disclosure.

FIG. 1B is a schematic diagram of the collision detection environment 100 in which the orientation device 112 of the vehicle 108 is oriented toward a focus direction 130 different from the direction of movement 128 of the vehicle 108, according to an aspect of the present disclosure. The warning system 116 may receive information about the focus direction 130 from the orientation device 112 by, for example, receiving a Bluetooth signal transmitted by the orientation device 112 using a Bluetooth receiver (not shown) of the warning system 116. The warning system 116 may compare the focus direction 130 with the direction of movement 128 and determine if there is a divergence between the two. The warning system 116 may also determine whether the divergence is greater than a threshold value, for example, 30 degrees. In response to making this determination, the warning system 116 may expand the warning zone from a first portion 120A corresponding the original warning zone area 120, to a second portion 120B corresponding to the expanded portion of the warning zone 120. In addition to expanding the warning zone 120 to include both the first portion 120A and the second portion 120B, the warning system 116 may optionally change the position of the warning zone 120 to correspond to the focus direction 130. This may be desirable because a change in the focus direction 130 may be indicative of the operator's intention to steer the vehicle 108 in that direction. It may be desirable to move the warning zone 120 towards the focus direction 130 so that objects 124 in the moved warning zone 120 may be detected and corresponding warning signals generated, as necessary.

Expanding the warning zone 120 in this manner may be desirable because it may allow objects 124 (e.g., object 124B) that are farther ahead of the vehicle 108 and less likely to be noticed by its operator to enter the warning zone 120. This may cause the warning system 116 to generate a corresponding warning signal that would not be generated if the size of the warning zone 120 were not dynamically defined by embodiments of the present disclosure.

Changing the position of the warning zone 120 as depicted in FIG. 1B may be desirable because the divergence between the focus direction 130 and the direction of movement 128 may indicate, in some circumstances, that the operator of the vehicle 108 intends to move in the direction of the focus direction 130. This may be the case, for example, where a bicyclist wishes to make a left turn rather than to continue along the path 104. The warning system 116 would therefore reshape the warning zone 130 to generate warnings for objects 124 that pose a relatively higher risk of collision with the vehicle 108 based on the estimation by the warning system 116 that the vehicle 108 is making a turn.

In the embodiment depicted in FIG. 1B, both the object 124A and the object 124B fall within the expanded warning zone 120. The object 124B falls within the second portion 120B of the warning zone 120, and its detection by the warning system 116 causes the warning system to generate a corresponding warning signal. This is in contrast to the example illustrated in FIG. 1A, wherein the warning zone 120 is smaller: the object 124B falls outside of the smaller warning zone 120 shown in FIG. 1A, and does not trigger a warning communication.

Figure 2:
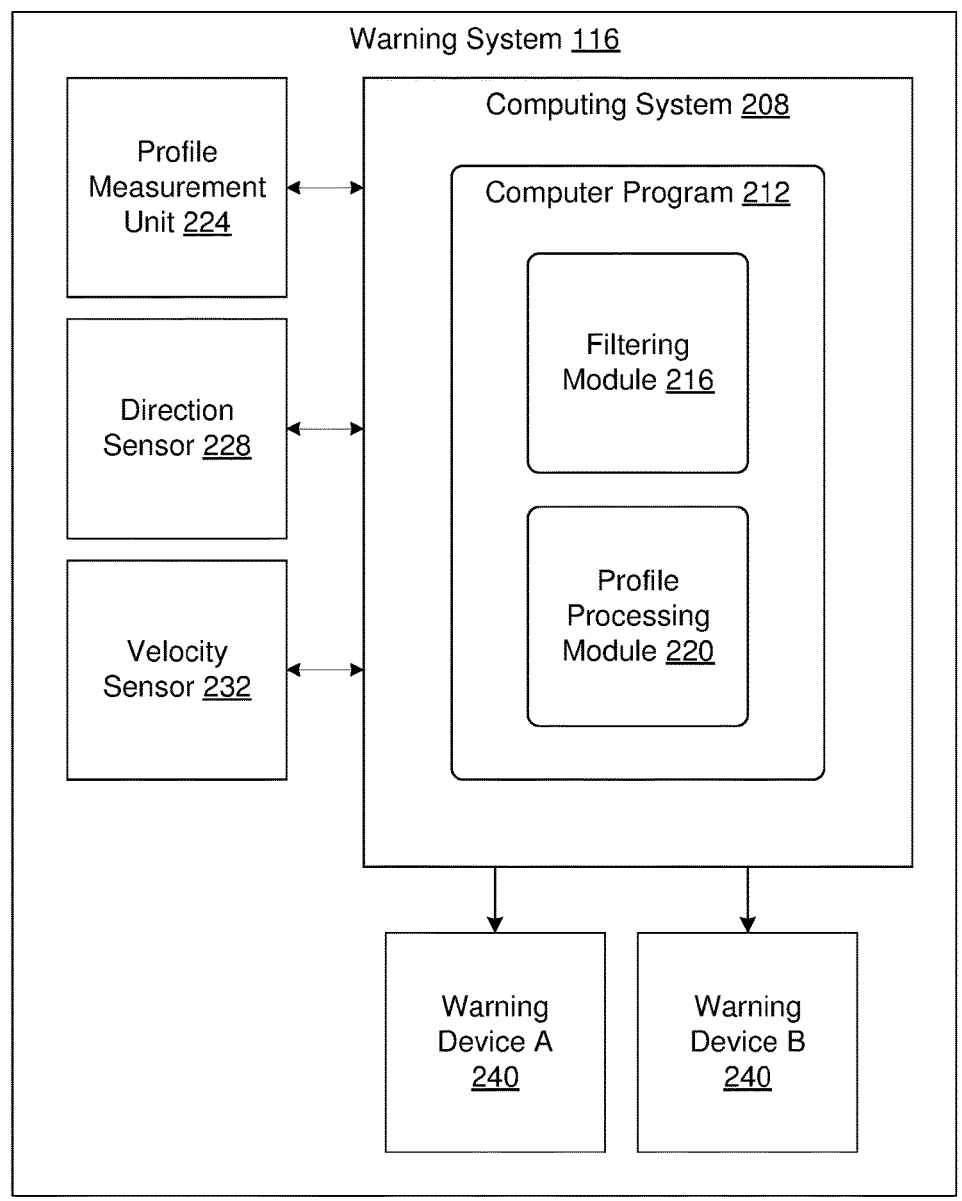
FIG. 2 is a schematic diagram showing details of a warning system of the collision detection environment depicted in FIGS. 1A-B, according to an aspect of the present disclosure.

FIG. 2 is a schematic block diagram showing exemplary components of the warning system 116 of the vehicle 108, according to an aspect of the present disclosure. The warning system 116 may be affixed to the vehicle 108 or to the operator of the vehicle 108, and, as described above, may monitor a monitoring area 132 including a warning zone 120 in the direction of movement 128 of the vehicle 108, which may be the same as a direction of the path 104.

The warning system 116 may include a profile measurement unit 224 that scans, or otherwise monitors the monitoring area 132 and the warning zone 120 for objects 124 that enter the monitoring area and the warning zone. The profile measurement unit 224 may perform one or more readings or scans of the monitoring area 132 to generate a profile of the monitoring area, for example, a depth profile in the direction of movement 128. The profile generated by the profile measurement unit 224 may identify spatial properties of the objects 124 in the monitoring area 132. Spatial properties of an object 124 in the monitoring area 132 may include, for examples, the object's 124 position, size, proximity to the vehicle 108, velocity relative to the vehicle 108, and velocity relative to an object other than the vehicle 108. Spatial properties of an object 124 are among the dynamic factors described above in relation to FIG. 1A that may be used by the warning system 116 to dynamically define and modify the size and shape of the warning zone 120 within the monitoring area 132.

The profile measurement unit 224 may be, for example, a Laser Profile Measurement Sensor, a LIDAR sensor, or any other profile measurement device known in the art, in accordance with embodiments of the present disclosure.

One or more profiles generated by the profile measurement unit 224 may be used by other components of the warning system 116, as described below, to initiate a desired responsive action, which may include, for example, generating a warning signal for transmission to other components of the warning system 116 or to another system.

The warning system 116 may also include a direction sensor 228 to detect the direction of movement 128 of the vehicle 108. The direction of movement 128 may be used by other components of the warning system 116. In one embodiment, the direction of movement 128 may be used to predict, for example, the path 104 that the vehicle 108 is travelling on. A change in the direction of movement 128 as determined by the direction sensor 228 may be used to adjust the collision awareness factor that determines the size and shape of the warning zone 120 of the monitoring area 132. The direction sensor 228 may be an electronic compass including, for example, a magnetometer. The magnetometer may be coupled with roll and pitch data from an accelerometer of the direction sensor 228 to determine additional direction/orientation details.

The warning system 116 may also include a velocity sensor 232 to detect the velocity of the vehicle 108. The warning system 116 may use the velocity information of the vehicle 108. For example, the velocity information may be used to determine the size, shape, and position of the warning zone 120 within the monitoring area 120. The velocity sensor 232 may also communicate velocity information of the vehicle 108 to other components of the warning system 116 for use in collision detection, including, for example, for determining whether the vehicle 108 faces a risk of collision with an object 124, and/or for adjusting the boundaries of the monitoring area 132 and the warning zone 120.

Figure 4:
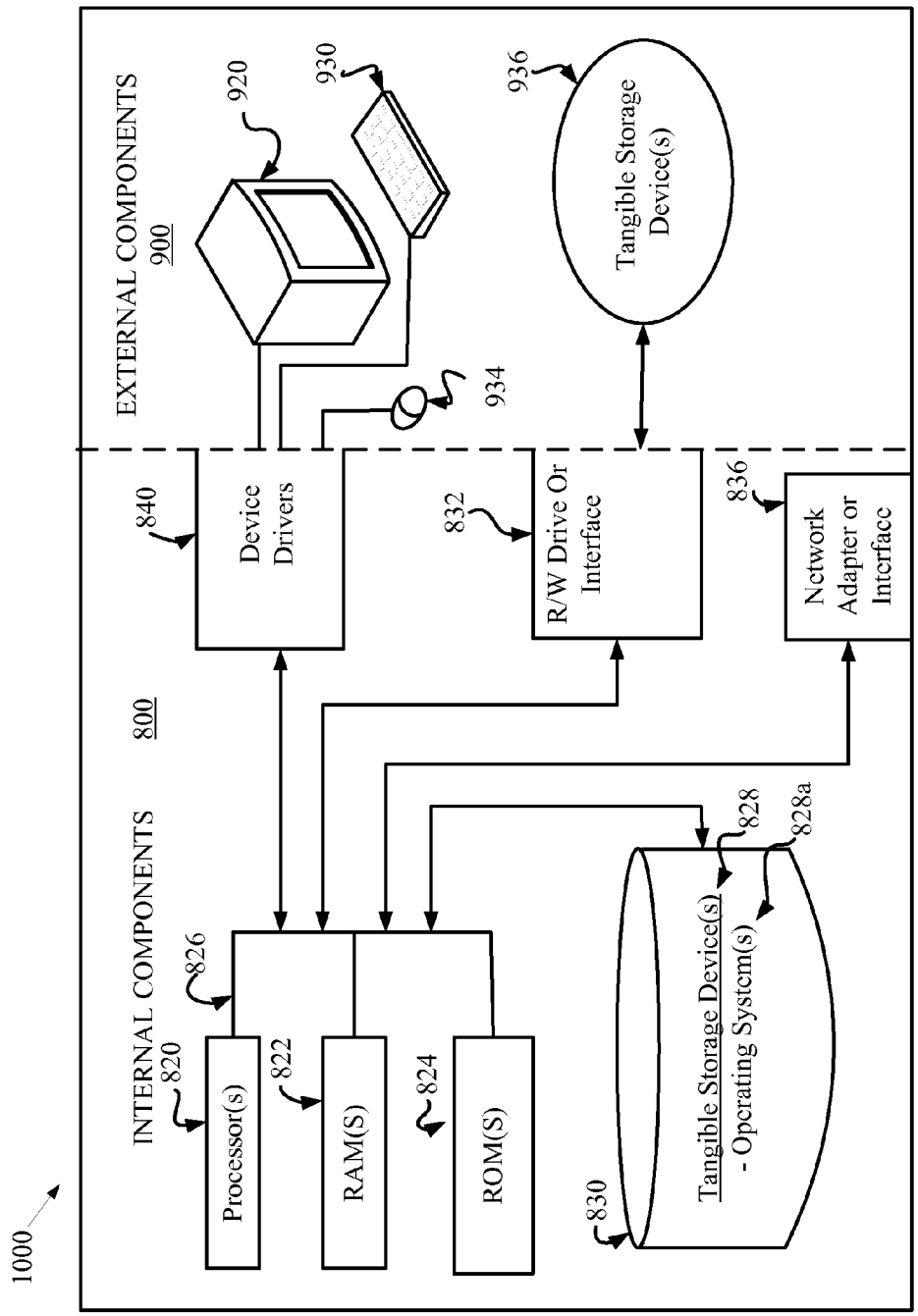
FIG. 4 is a schematic block diagram of a computer system, according to an aspect of the present disclosure.

The warning system 116 may also include a computing system 208 that includes one or more processors and tangible storage devices, for example, processor(s) 820 and tangible storage device(s) 830 (FIG. 4). The computing system 208 may be in communication with other components of the warning system 116, including those described above, such as the profile measurement unit 224, the direction sensor 228, and the velocity sensor 232. A computer program 212 may be embodied on the tangible storage device of the computing system 208. The computer program 212 may have one or more modules including, for example, a profile processing module 220 and a filtering module 216.

Modules of the computer program 212 may perform a variety of functions including, without limitation, generate warning communications to components of the warning system 116, the vehicle 108, and/or to the operator of the vehicle 108, and/or to initiate a responsive action such as maneuvering to avoid an object 124 that has a high risk of colliding with the vehicle 108.

The profile processing module 220 of the computer program 212 may receive and analyze the profiles generated by the profile measurement unit 224 of the warning system 116 to determine the location, velocity, and trajectory of movement of an object 124 that is within the monitoring area 132. The profile processing module 220 may additionally determine whether the object 124 is within the warning zone 120 of the monitoring area 132, or whether the object's 124 trajectory, based on its velocity and direction of movement, will cause the object to enter the warning zone 120. For any object 124 in the warning zone 120, or any object 124 whose trajectory may cause the object to enter the warning zone 120, the profile processing module 220 may generate a warning signal which is transmitted to the filtering module 216.

The filtering module 216 of the computer program 212 may analyze data from the profile measurement unit 224, the direction sensor 228, the velocity sensor 232, and other modules of the computer program 212 to determine the collision awareness factor, which may be used to determine the shapes and size of the warning zone 120, and to filter warning signals that may be generated by the profile processing module 220 of the program 212.

In one embodiment of the present disclosure, the filtering module 216 may determine the collision awareness factor by determining a divergence between the direction of movement 128 of the vehicle 108, and the focus direction 130 of the orientation device 112, whereby the latter may indicate the direction in which an operator of the vehicle 108 is looking. The filtering module 216 may determine whether the divergence is greater than a threshold value. The divergence may be measured, for example, as an angular difference between the direction of movement 128 and the focus direction 130. The threshold value may be, for example, 45 degrees. This divergence may indicate, for example, that certain obstacles 124 within the monitoring area 132 may only be within the operator's peripheral vision. If so, the filtering module 216 may determine that the collision awareness factor may be low. In a related embodiment, each degree of divergence may correspond to a proportional decrease in the collision awareness factor. For example, a 90-degree divergence may indicate a 50% awareness factor. Other scales that quantify the collision awareness factor as a function of the divergence angle are possible.

In another embodiment, the filtering module 216 may determine the collision awareness factor by determining whether one or more objects 124 in the monitoring area 132 or in the warning zone 120 are stationary or moving. Whether the objects 124 are stationary or may be determined by, for example, their velocity relative to another object, or relative to another point of reference in the collision detection environment 100. The warning system 116 may determine this information using, for example, the profile measurement unit 224 and analyzing changes in its profile readings over time. In one embodiment, the more objects 124 whose velocities are above a threshold value, the lower the collision awareness factor may be. This may indicate, for example, that it is relatively more difficult for the operator of the vehicle 108 to maintain an awareness of the objects 124, because the velocities of the objects 124 relative to the vehicle 108 are too high. In a related embodiment, the filtering module 216 may apply an adjustment to the collision awareness factor based on the velocity of each object 124, such that increased velocities of objects 124 in the monitoring area 132, or in the warning zone 120, as determined/detected by the profile measurement unit 224 and the profile processing module 220, result in lowering of the collision awareness factor.

In another embodiment, the filtering module 216 may determine the collision awareness factor by determining the number of objects 124 detected by the profile measurement unit 224. The higher the number of objects 124, the lower the collision awareness factor may be, and vice versa.

In another embodiment, the filtering module 216 may determine the collision awareness factor by determining the size of a detected object 124. For example, the larger the object 124, the higher the collision awareness factor may be. The collision awareness factor may also be determined based on an average size of all the objects 124 detected in the monitoring area 132 and/or in the warning zone 120. In a related embodiment, this average may be only for moving objects 124.

In another embodiment, the filtering module 216 may determine the collision awareness factor based on two or more factors. For example, the filtering module 216 may determine that an object 214 having a size that exceeds a threshold value is in the warning zone 120 of the monitoring area 132. Although the filtering module 216 may increase the collision awareness factor based on the size of an object 124, on the assumption that larger objects 124 are easier for the operator of the vehicle 108 to see, and require less warning, it may be the case that the orientation device 112 indicates that the focus area 130 diverges from the direction of movement 128 by a number of degrees exceeding a threshold value. In the case of a bicycle, for example, this may be because the helmet to which the orientation device 112 is attached is turned away from the direction of movement 128. This in turn may indicate that the bicyclist is looking away from the direction of movement 128. In such circumstances, one consideration may be given more weight than another, such that the filtering module 216 may lower the collision awareness factor. This may be desirable where, for example, although a large object 124 is relatively easier to see, a distracted operator faces a greater risk of collision or risk of greater damage that may result from a collision.

The collision awareness factor may be based on a real number in the range of 0-1 or a percentage from 0-100%, wherein 0 may indicate a minimum awareness of the object 124, and 1 or 100% may indicate a maximum awareness of the object 124. Based on the value of the collision awareness factor falling above or below a threshold value or a threshold range value, the filtering module 216 may allow or filter out a warning message/signal.

Changes in the collision awareness factor may dynamically affect the configuration of the warning zone 120 including, for example, its size and shape. For example, as the collision awareness factor decreases, the warning zone may be enlarged to encompass a greater proportion of the monitoring area 132. As the collision awareness factor increases, on the other hand, the warning zone 120 may be contracted. This may be desirable because the risk of collision may not be the only factor relevant in determining whether a warning signal should be generated. In some circumstances, it may be desirable not to generate a warning at all. For example, if the collision detection environment 100 includes many obstacles, it may be possible that generating too many warnings itself may distract an operator of the vehicle 108 from concentrating on the path 108.

Figure 3:
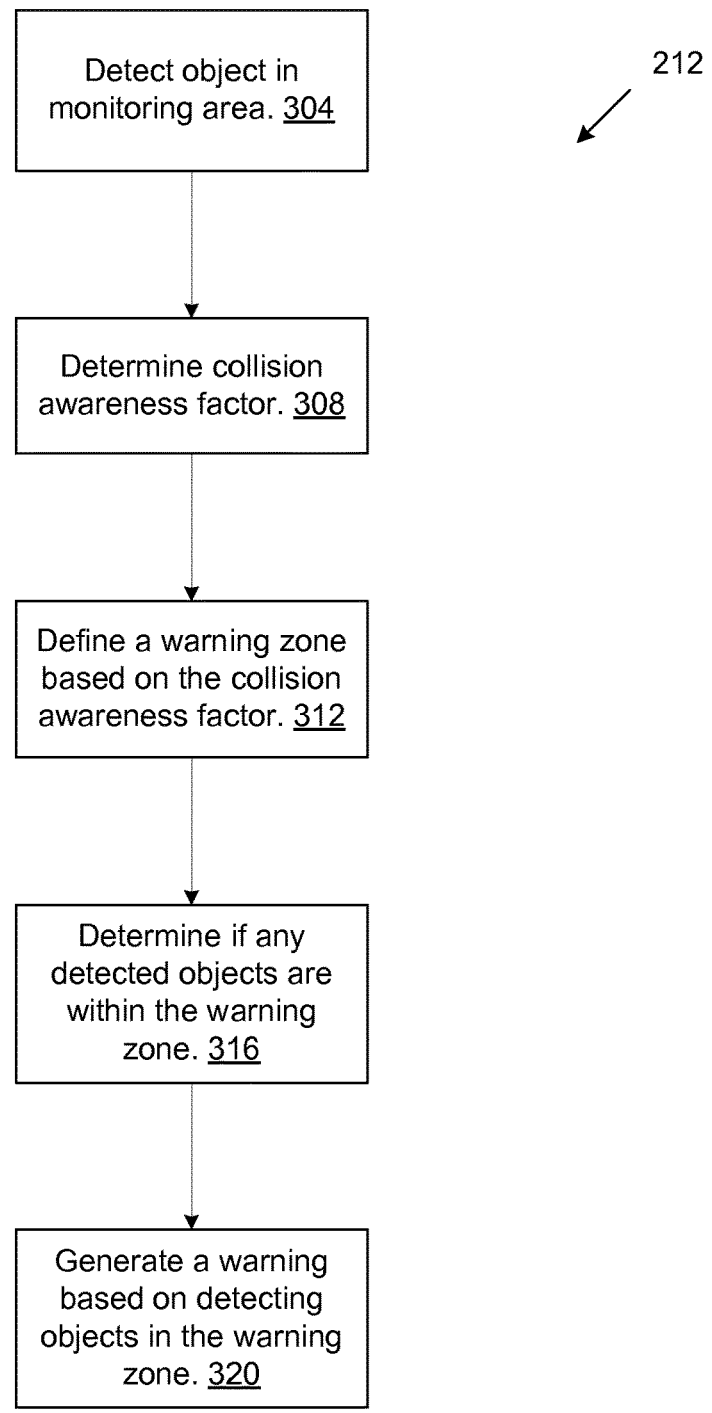
FIG. 3 is a flowchart of steps of a computer program of the warning system shown in FIG. 1, according to an aspect of the present disclosure.

FIG. 3 is a flowchart of steps of the computer program 212 of the warning system 116 shown in FIGS. 1A-2, according to an aspect of the present disclosure. The depicted steps of the program 212 correspond to functionality of the program 212 that may be implemented using one or more computer program modules, such as the filtering module and the profile processing module described above, in connection with FIG. 2.

In step 304, the program 212 may detect an object in a monitoring area of a profile measurement unit of a warning system. For example, in one embodiment, an object 124 may be detected in the monitoring area 132 by the profile measurement unit 224 of the warning system 116, as depicted in FIGS. 1A-B. The monitoring area 132 may be defined by the warning system 116, including by its profile measurement unit 224 using, for example, LIDAR technology. As the profile measurement unit 224 monitors the monitoring area 132, the program 212 may receive the corresponding profile data, which includes measurements corresponding to spatial properties of the objects 124 in the collision detection environment 100, and analyze it using the profile processing module 220 to detect and identify objects 124 in the monitoring area 132. In step 304, the program 212 may additionally analyze the profile information to determine spatial properties of the objects 124 including, for example, size, shape, number, density, proximity, velocity, direction of movement, and other information about the objects 124. Such information may be used to define, in other steps, the size, shape, and position of the monitoring area 132, and the size, shape, and position of the warning zone 120 within the monitoring area 132.

In step 308, the program 212 may determine a collision awareness factor by analyzing the spatial properties of objects 124 detected in the monitoring area 132 in step 304. Determination of the collision awareness factor by the program 212 may be based on one or more static or dynamic factors, or a combination thereof.

Static factors that affect the determination of the collision awareness factor may include, for example, the type of vehicle 108 to which the warning system 116 is attached. This factor is static because it does not change over time while the warning system 116 is used in conjunction with the vehicle 108. Static factors may be defined, for example, in a configuration file stored on a tangible storage device of the computer system 208 on the processor of which the program 212 is executed. The configuration file may include, for example, predetermined size and shape settings for the monitoring area 132. The program 212 may communicate these settings to the profile measurement unit 224 such that the profile measurement unit 224 monitors an area according to the settings. For example, settings for the monitoring area 132 where the warning system 116 is used in a car may indicate a larger area compared to that of a bicycle.

Dynamic factors that affect the determination of the collision awareness factor may include factors that change over time. Dynamic factors may be determined by the program 212 using components of the warning system 116 or information received by the warning system 116 from another source. The may be, for example: the speed of the vehicle 108 determined by the velocity sensor 232; the direction of movement 128 of the vehicle 108 determined by the direction sensor 228; spatial properties of the objects 124 in the collision detection environment 100 as indicated by profile measurements of the profile measurement unit 224; the focus direction 130 as received by the warning system 116 from the orientation device 112. Each of these dynamic factors may have a corresponding effect on the collision awareness factor.

In one embodiment, the program 212 may access a configuration table that defines the relationship between changes in a dynamic factor and the collision awareness factor. For example, the configuration table for dynamic factors may be Table 1, below, wherein increasing ranges of speed of the vehicle 108 are associated with corresponding decreases in the collision awareness factor relative to a starting value of the collision awareness factor:

TABLE 1

Change In Speed & Collision Awareness Factor

| Speed | Collision Awareness Factor (relative to a starting value) |
|---|---|
| 0-30 mph | −10% |
| 31-50 mph | −30% |
| 50-70 mph | −40% |
| 70+ mph | −60% |

In the example shown in Table 1, as the warning system 116 detects an increase in the vehicle's 108 speed, the program 212 reduces the collision awareness factor by a predetermined proportion of a starting value of the collision awareness factor. For example, the starting value of the collision awareness factor may be 100% (indicating a strong awareness). In another example, the starting value of the collision awareness factor may be 80% based on another factor, dynamic or static, influencing the starting value. For example, the starting value may be at 80% based on the profile measurement unit 224 detecting that a number of objects 124 higher than a threshold value have (e.g., 3 objects 124), detected in the monitoring area 132, are larger than a threshold size (e.g., 2×2 feet). The 80% starting value may be based on a corresponding table that associates numbers of objects 124 detected in the monitoring area 132 with corresponding changes in the collision awareness factor.

Based on the collision awareness factor defined in step 308, the program 212 may define, in step 312, the shape, size, and other properties of the warning zone 120. This may be done, in one embodiment, by associating ranges in the collision awareness factor with corresponding size settings, as shown, for example, in Table 2:

TABLE 2

Collision Awareness Factor & Size of Warning Zone 120

| Collision Awareness Factor | Size of warning zone 120 relative to size of the monitoring area 132 |
|---|---|
| 80-100% | 2% |
| 60-80% | 5% |
| 50-60% | 10% |
| <50% | 20% |

In a related embodiment, the program 212 may, in step 312, also adjust the size, shape, and other properties of the monitoring area 132 based on changes in the collision awareness factor. For example, when determining a relatively low collision awareness factor, the program 212 may cause the profile measurement unit 224 to monitor a larger monitoring area 132, or perform the monitoring at a higher resolution.

In step 316, the program 212 may determine whether an object 124, which may be detected in the monitoring area 132 in step 304, is also within the warning zone 120 that is defined in step 312, and whether a corresponding warning signal should be generated by the program 212. Generally, a warning signal may be generated for any object 124 detected in the warning zone 120 of which the program 212 estimates the operator of the vehicle 108 to be unaware. The program 212 determines whether a warning signal should be generated based on determinations of the collision awareness factor in step 308, and detection of objects 124 in the warning zone 120, made in step 316.

The program 212 may perform step 316 by analyzing the profile measurements made by the profile measurement unit 224 and analyzed by the profile processing module 220. The program 212 may filter the results of this analysis using the filtering module 216. The filtering module 216 may filter the results of the analysis relation to a set of warning criteria to determine whether a corresponding warning signal should be generated.

The warning criteria may be based on a desired configuration. For example, such a configuration may be based on spatial properties of the objects 124 detected in the warning zone 120. The corresponding criteria may be, for example, as follows: if an object is smaller in size relative to a threshold size value, the filtering module 216 may determine that no corresponding warning signal should be generated. On the other hand, for any object 124 whose size is larger than the threshold value, the filtering module 216 may determine that a corresponding warning signal should be generated.

As a further example, the criteria may be: if an object is smaller in size relative to a threshold size value, whereby the filtering module 216 may ordinarily determine that no corresponding warning signal should be generated, a warning signal should be generated nevertheless if the program 212 determines, in communication with the orientation device 112, that the focus direction 130 diverges from the direction of movement of the vehicle 108 by more than a threshold value (e.g., 30 degrees).

In step 320, the program 212 may generate one or more warning signals corresponding to any object 124 for which the filtering module 220 determines, in step 316, that a warning signal should be generated. For any object 124 detected in the warning zone 120 for which the program 212 determines a warning signal should be generated, the program 212 may generate the warning signal and communicate it to a warning device 240 of the warning system 116, or to a receiving device. The receiving device may be, for example, another device in the vehicle 108, such as a digital display or an audio output source that can receive a signal transmitted by the warning system 116. For example, the program 212 may cause the warning system 116 to transmit a Bluetooth signal to the receiving device.

Referring now to FIG. 4, a computing device 1000 may include respective sets of internal components 800 and external components 900. The computing device 1000 may be or may include, for example, the warning system 116 (FIGS. 1A-2) and/or the orientation device 112 (FIGS. 1A-B) and/or one of their internal components. Each of the sets of internal components 800 includes one or more processors 820; one or more computer-readable RAMs 822; one or more computer-readable ROMs 824 on one or more buses 826; one or more operating systems 828; one or more software applications 828a (e.g., device driver modules) executing the program 212 (FIGS. 2-3); and one or more computer-readable tangible storage devices 830. The one or more operating systems 828 and device driver modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
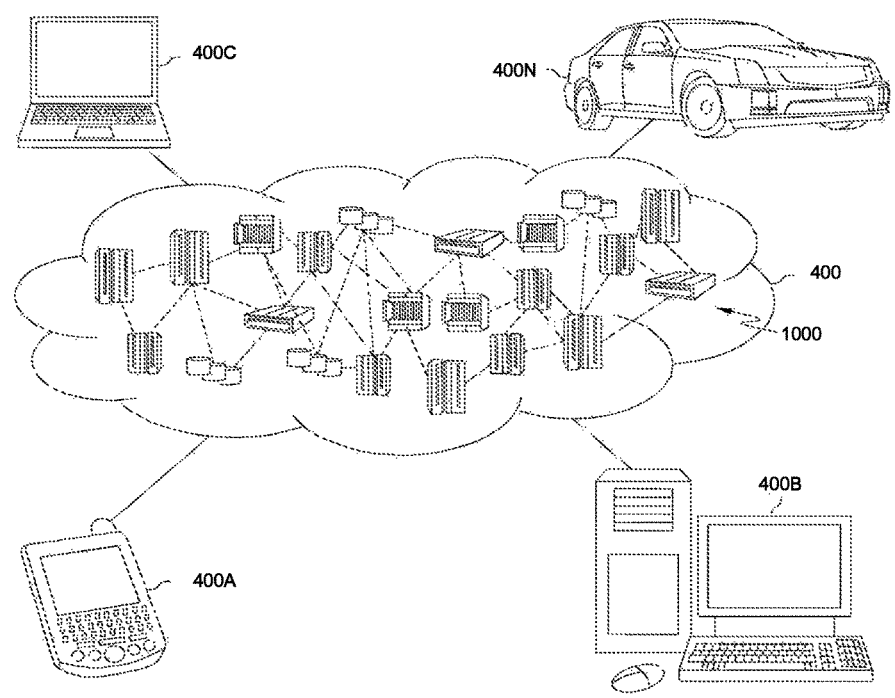
FIG. 5 is a schematic block diagram of an illustrative cloud computing environment, according to an aspect of the present disclosure.

Referring now to FIG. 5, an illustrative cloud computing environment 400 is depicted. As shown, the cloud computing environment 400 comprises one or more cloud computing nodes, each of which may be a computing system 1000 (FIG. 4) with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that the computing nodes 1000 and the cloud computing environment 400 can communicate with any type of computerized device over any type of network and/or network addressable connection (e.g., using a web browser).

Figure 6:
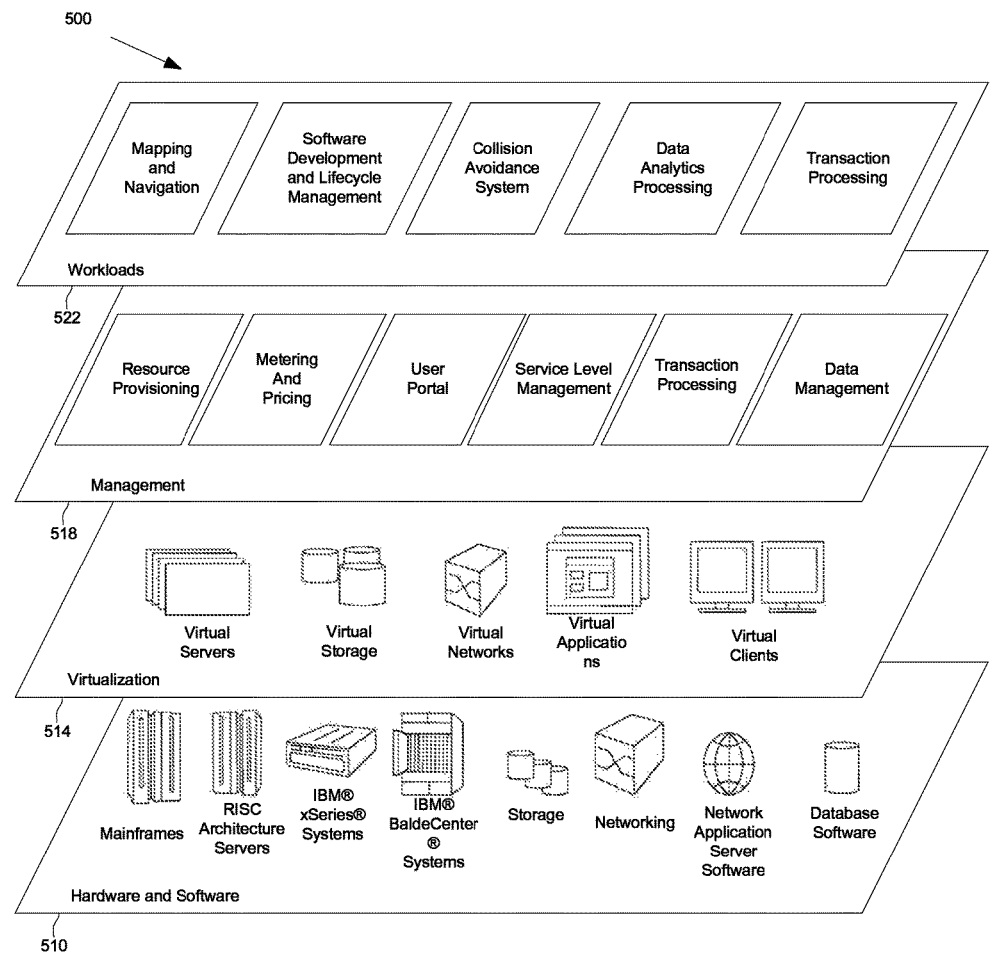
FIG. 6 is a multi-layered functional illustration of the cloud computing environment depicted in FIG. 5, according to an aspect of the present disclosure.

Referring now to FIG. 6, a set of functional abstraction layers provided by the cloud computing environment 400 (FIG. 5) is shown. It should be understood in advance that the components, layers, and functions shown in FIG. 6 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and collision warning systems such as the warning system 116 (FIGS. 1A-3).

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer implemented method for generating a collision warning, the method comprising:

defining, by a computer, a monitoring area monitored by a warning device attached to a first object, wherein the monitoring area moves with the warning device;

detecting, by the computer, a second object in the monitoring area;

determining, by the computer, a change in a collision awareness factor in relation to the monitoring area, the collision awareness factor corresponding to an estimated awareness level of an operator of the first object of a likelihood of collision with the second object, wherein determining the collision awareness factor is based on a type of vehicle of the first object, a maneuverability of the first object, a type of one or more objects expected to be encountered by the first object, a direction of movement of the first object, a velocity of the first object, an angular divergence of a focus direction relative to a movement direction of the first object, a number and a distribution of one or more objects within the monitoring area, a velocity of one or more objects within the monitoring area, a size and a shape of one or more objects within the monitoring area, a position and a proximity of one or more objects within the monitoring area, a current weather condition in the monitoring area, a light condition in the monitoring area, a time of day and a level of humidity in the environment of the first object and is used to adjust a shape and a size of a warning zone;

defining, by the computer, the warning zone in relation to the monitoring area based on the collision awareness factor;

and generating, by the computer, a warning based on at least the second object being within the warning zone, and the change in the collision awareness factor.

2. The method of claim 1, further comprising:

detecting, by the computer, the second object in the monitoring area, wherein the detecting comprises detecting one or more of: a size of the second object, a shape of the second object, and a position of the second object relative to a direction of movement of the first object; and wherein determining the collision awareness factor comprises determining the collision awareness factor based at least on one or more of: the size of the second object, the shape of the second object, and the position of the second object relative to the direction of movement of the first object.

3. The method of claim 1, further comprising:

detecting, by the computer, two or more second objects in the monitoring area, wherein the detecting is based on detecting a number of second objects detected in the warning area, a size of each of the second objects, a shape of each of the second objects, a velocity of each of the second objects relative to the warning device, and an average velocity of all of the second objects.

4. The method of claim 1, further comprising:

detecting a direction of movement of the first object;

detecting an orientation direction of a third object using a gyroscope coupled with an accelerometer;

determining a divergence between the direction of movement of the first object and the orientation direction of the third object; and wherein determining the collision awareness factor comprises determining the collision awareness factor based at least on the determined divergence.

5. The method of claim 1, wherein determining a collision awareness factor comprises:
    determining the collision awareness factor based on detecting any one or more of:
    a responsive action relative to the second objects;
    a first change in a direction of movement of the first object, wherein the first change is higher than a first threshold value; and
    a second change in a velocity of the first object, wherein the second change is higher than a threshold value.

6. The method of claim 1, further comprising:
    modifying the defined monitoring area based on the collision awareness factor.

7. A computer system for generating a collision warning, the system comprising:
    a computer device having a processor and a tangible storage device, wherein the computer is attached to a first object; and
    a program embodied on the storage device for execution by the processor, the program having a plurality of program modules, the program modules including:
    a first defining module configured to define a monitoring area monitored by the computer device, wherein the monitoring area moves with the computer device;
    a first detecting module configured to detect a second object in the monitoring area;
    a first determining module configured to determine a change in a collision awareness factor in relation to the monitoring area, the collision awareness factor corresponding to an estimated awareness level of an operator of the first object of a likelihood of collision with the second object, wherein determining the collision awareness factor is based on a type of vehicle of the first object, a maneuverability of the first object, a type of one or more objects expected to be encountered by the first object, a direction of movement of the first object, a velocity of the first object, an angular divergence of a focus direction relative to a movement direction of the first object, a number and a distribution of one or more objects within the monitoring area, a velocity of one or more objects within the monitoring area, a size and a shape of one or more objects within the monitoring area, a position and a proximity of one or more objects within the monitoring area, a current weather condition in the monitoring area, a light condition in the monitoring area, a time of day and a level of humidity in the environment of the first object and is used to adjust a shape and a size of a warning zone;
    a second defining module configured to define a warning zone in relation to the monitoring area based on the collision awareness factor; and
    a generating module configured to generate a warning based on detecting at least the second object being within the warning zone, and the collision awareness factor.

8. The computer system of claim 7, wherein:
    the first detecting module is further configured to detect one or more of: a size of the second object, a shape of the second object, and a position of the second object relative to a direction of movement of the first object; and
    the first determining module is configured to determine the collision awareness factor based at least on one or more of: the size of the second object, the shape of the second object, and the position of the second object relative to the direction of movement of the first object.

9. The computer system of claim 7, wherein:
    the first detecting module is further configured to detect two or more second objects in the monitoring area, wherein the detecting is based on detecting a number of second objects detected in the warning area, a size of each of the second objects, a shape of each of the second objects, a velocity of each of the second objects relative to the warning device, and an average velocity of all of the second objects.

10. The computer system of claim 7, wherein:
    the program modules further include:
    a second detecting module configured to detect a direction of movement of the first object, and to detect an orientation direction of a third object using a gyroscope coupled with an accelerometer; and
    a second determining module configured to determine a divergence between the direction of movement of the first object and the orientation direction of the third object; and
    the first determining module is further configured to determine the collision awareness factor based at least on the determined divergence.

11. The computer system of claim 7, wherein the first determining module is further configured to determine the collision awareness factor based on detecting any one or more of:
    a responsive action relative to the second objects;
    a first change in a direction of movement of the first object, wherein the first change is higher than a first threshold value; and
    a second change in a velocity of the first object, wherein the second change is higher than a threshold value.

12. The computer system of claim 7, wherein the program modules further include:
    a modifying module configured to modify the monitoring area based on the collision awareness factor.

13. A computer program product for generating a collision warning, comprising a tangible storage device having program code embodied therewith, the program code executable by a processor of a computer to perform a method comprising:
    defining, by the processor, a monitoring area monitoring by a warning device attached to a first object, wherein the monitoring area moves with the warning device;
    detecting, by the processor, a second object in the monitoring area;
    determining, by the processor, a change in a collision awareness factor in relation to the monitoring area, the collision awareness factor corresponding to an estimated awareness level of an operator of the first object of a likelihood of collision with the second object, wherein determining the collision awareness factor is based on a type of vehicle of the first object, a maneuverability of the first object, a type of one or more objects expected to be encountered by the first object, a direction of movement of the first object, a velocity of the first object, an angular divergence of a focus direction relative to a movement direction of the first object, a number and a distribution of one or more objects within the monitoring area, a velocity of one or more objects within the monitoring area, a size and a shape of one or more objects within the monitoring area, a position and a proximity of one or more objects within the monitoring area, a current weather condition in the monitoring area, a light condition in the monitoring area, a time of day and a level of humidity in the environment of the first object and is used to adjust a shape and a size of a warning zone;

defining, by the processor, a warning zone in relation to the monitoring area based on the collision awareness factor; and generating, by the processor, a warning based on at least the second object being within the warning zone, and the collision awareness factor.

14. The computer program product of claim 13, wherein the method further comprises:

detecting, by the processor, the second object in the monitoring area, wherein the detecting comprises detecting one or more of: a size of the second object, a shape of the second object, and a position of the second object relative to a direction of movement of the first object; and wherein determining the collision awareness factor comprises determining the collision awareness factor, by the processor, based at least on one or more of: the size of the second object, the shape of the second object, and the position of the second object relative to the direction of movement of the first object.

15. The computer program product of claim 13, wherein the method further comprises:

detecting, by the processor, two or more second objects in the monitoring area, wherein the detecting is based on detecting a number of second objects detected in the warning area, a size of each of the second objects, a shape of each of the second objects, a velocity of each of the second objects relative to the warning device, and an average velocity of all of the second objects.

16. The computer program product of claim 13, wherein the method further comprises:

detecting, by the processor, a direction of movement of the first object;

detecting, by the processor, an orientation direction of a third object using a gyroscope coupled with an accelerometer;

determining, by the processor, a divergence between the direction of movement of the first object and the orientation direction of the third object; and wherein determining the collision awareness factor comprises determining the collision awareness factor, by the processor, based at least on the determined divergence.

17. The computer program product of claim 13, wherein the method further comprises:

determining the collision awareness factor, by the processor, based on detecting any one or more of:

a responsive action relative to the second objects;

a first change in a direction of movement of the first object, wherein the first change is higher than a first threshold value; and a second change in a velocity of the first object, wherein the second change is higher than a threshold value.

* * * * *